US012430877B2

(12) United States Patent
He et al.

(10) Patent No.: US 12,430,877 B2
(45) Date of Patent: Sep. 30, 2025

(54) DATA MATCHING METHOD, APPARATUS AND SYSTEM, AND DEVICE AND MEDIUM

(71) Applicant: CHINA UNIONPAY CO., LTD., Shanghai (CN)

(72) Inventors: Shuo He, Shanghai (CN); Hongbao Liu, Shanghai (CN); Jianbin Zheng, Shanghai (CN); Pengfei Gao, Shanghai (CN); Liang Li, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/998,939

(22) PCT Filed: Dec. 7, 2022

(86) PCT No.: PCT/CN2022/137363
§ 371 (c)(1),
(2) Date: Jan. 27, 2025

(87) PCT Pub. No.: WO2024/027066
PCT Pub. Date: Feb. 8, 2024

(65) Prior Publication Data
US 2025/0259416 A1 Aug. 14, 2025

(30) Foreign Application Priority Data
Aug. 4, 2022 (CN) .......................... 202210933633.2

(51) Int. Cl.
*G06K 9/00* (2022.01)
*G06V 10/75* (2022.01)
*G06V 30/19* (2022.01)

(52) U.S. Cl.
CPC ........ *G06V 10/75* (2022.01); *G06V 30/19093* (2022.01)

(58) Field of Classification Search
None
See application file for complete search history.

(56) References Cited

U.S. PATENT DOCUMENTS

| 2016/0119119 A1 | 4/2016 | Calapodescu et al. |
| 2020/0259638 A1* | 8/2020 | Carmignani ............ H04L 9/085 |
| 2021/0336770 A1 | 10/2021 | Ahmed et al. |

FOREIGN PATENT DOCUMENTS

| CN | 105046234 A | 11/2015 |
| CN | 114817943 A | 7/2022 |
| TW | I712301 A | 12/2020 |

OTHER PUBLICATIONS

The World Intellectual Property Organization (WIPO) International Search Report for PCT/CN2022/137363 Apr. 28, 2023 5 Pages (including translation).

* cited by examiner

*Primary Examiner* — Sj Park
(74) *Attorney, Agent, or Firm* — ANOVA LAW GROUP, PLLC

(57) ABSTRACT

The disclosure provides a data matching method, and the method includes inputting to-be-matched first data into a pre-trained vector transformation model, to obtain a first vector corresponding to the first data and a binary vector corresponding to the first vector; obtaining a first intermediate vector using an oblivious transfer protocol, and obtaining a first distance intermediate result based on the first intermediate vector and a first predefined algorithm; receiving a second distance intermediate result generated, based on a second vector, a first random vector, and a second predefined algorithm, and sent by a second device; determining a target distance between the first vector and the second vector based on the first vector, the first distance intermediate result, and the second distance intermediate result; and determining whether the first data and second data match based on the target distance and a predefined first distance threshold.

20 Claims, 4 Drawing Sheets

DATA MATCHING METHOD, APPARATUS AND SYSTEM, AND DEVICE AND MEDIUM

CROSS-REFERENCE TO RELATED APPLICATION

This application is a national phase entry under 35 U.S.C. § 371 of International Application No. PCT/CN2022/137363, filed on Dec. 7, 2022, which claims priority to Chinese Patent Application No. 202210933633.2 entitled "DATA MATCHING METHOD, APPARATUS AND SYSTEM, AND DEVICE AND MEDIUM," filed on Aug. 4, 2022, the entire content of all of which is incorporated herein by reference.

FIELD OF THE DISCLOSURE

The disclosure generally relates to the field of data processing technology and, more particularly, relates to a data matching method, apparatus, system, device and medium.

BACKGROUND

At present, privacy computing technology is mainly used in secure intersection and federated learning. The so-called secure intersection refers to identifying the intersection of the data of both parties, for example, identifying the common users of institution A and institution B. The secure intersection is also the first step of vertical federated learning, that is, first perform secure intersection on key information such as mobile phone numbers, ID numbers, business license numbers, and then proceed to the next step of joint modeling.

In the existing technologies, in order to identify the intersection of the data of both parties or to achieve the matching of the data of both parties, common secure intersection algorithms include secure intersection algorithms based on Rivest-Shamir-Adleman (RSA) encryption algorithms, etc. However, the current secure intersection algorithms may merely successfully match when the data of both parties are exactly the same, that is, when the data types of the data of both parties and the number of characters contained in the data are exactly the same. However, in actual applications, there are often many usage scenarios when the to-be-matched data is not exactly the same. Therefore, the secure intersection algorithms in the existing technologies greatly limit their usage scenarios and affect the matching service scope.

SUMMARY

The disclosure provides a data matching method, apparatus, system, device and medium to solve the problems that the secure intersection algorithms in the existing technologies may merely perform secure intersection when the data of both parties are exactly the same, which has limited usage scenarios and affects the service scope of data matching.

In a first aspect, the disclosure provides a data matching method, applied to a first device, the method including: inputting to-be-matched first data into a pre-trained vector transformation model, to obtain a first vector corresponding to the first data and a binary vector corresponding to the first vector; obtaining a first intermediate vector using an oblivious transfer (OT) protocol, and obtaining a first distance intermediate result based on the first intermediate vector and a first predefined algorithm, where the first intermediate vector is generated based on the binary vector corresponding to the first vector, a second vector and a first random vector, the second vector is obtained by a second device inputting second data into the pre-trained vector transformation model on the second device, and the first random vector is generated by the second device based on the OT protocol; receiving a second distance intermediate result generated, based on the second vector, the first random vector, and a second predefined algorithm, and sent by the second device; determining a target distance between the first vector and the second vector based on the first vector, the first distance intermediate result, and the second distance intermediate result; and determining whether the first data and the second data match based on the target distance and a predefined first distance threshold.

In a second aspect, the disclosure provides a data matching method, applied to a second device, the method including: inputting to-be-matched second data into a pre-trained vector transformation model to obtain a second vector corresponding to the second data, and generating a first random vector based on an OT protocol; and generating a second distance intermediate result based on the second vector, the first random vector and a second predefined algorithm, and sending the second distance intermediate result to a first device, so that the first device determines a target distance between a first vector and the second vector based on the first vector, a first distance intermediate result and the second distance intermediate result, and determines whether first data and the second data match based on the target distance and a predefined first distance threshold, where the first vector is obtained by inputting the first data into the pre-trained vector transformation model on the first device, the first distance intermediate result is obtained based on a first intermediate vector and a first predefined algorithm, and the first intermediate vector is generated based on a binary vector corresponding to the first vector, the second vector and the first random vector.

In a third aspect, the disclosure provides a data matching apparatus, applied to a first device, the device including: a first acquisition module, configured to input to-be-matched first data into a pre-trained vector transformation model, to obtain a first vector corresponding to the first data and a binary vector corresponding to the first vector; a first processing module, configured to obtain a first intermediate vector using an OT protocol, and obtain a first distance intermediate result based on the first intermediate vector and a first predefined algorithm, where the first intermediate vector is generated based on the binary vector corresponding to the first vector, a second vector and a first random vector, the second vector is obtained by a second device inputting second data into the pre-trained vector transformation model on the second device, and the first random vector is generated by the second device based on the OT protocol, where the first processing module is further configured to receive a second distance intermediate result generated, based on the second vector, the first random vector, and a second predefined algorithm, and sent by the second device, and determine a target distance between the first vector and the second vector based on the first vector, the first distance intermediate result, and the second distance intermediate result; and a first determination module, configured to determine whether the first data and the second data match based on the target distance and a predefined first distance threshold.

In a fourth aspect, the disclosure provides a data matching apparatus, applied to a second device, the device including: a second acquisition module, configured to input to-bematched second data into a pre-trained vector transformation model to obtain a second vector corresponding to the second data, and generate a first random vector based on an OT protocol; and a second processing module, configured to generate a second distance intermediate result based on the second vector, the first random vector and a second predefined algorithm, and send the second distance intermediate result to a first device, so that the first device determines a target distance between a first vector and the second vector based on the first vector, a first distance intermediate result and the second distance intermediate result, and determines whether first data and the second data match based on the target distance and a predefined first distance threshold, where the first vector is obtained by inputting the first data into the pre-trained vector transformation model on the first device, the first distance intermediate result is obtained based on a first intermediate vector and a first predefined algorithm, and the first intermediate vector is generated based on a binary vector corresponding to the first vector, the second vector and the first random vector.

In a fifth aspect, the disclosure provides a data matching system, the system including: a first device, configured to input to-be-matched first data into a pre-trained vector transformation model, to obtain a first vector corresponding to the first data and a binary vector corresponding to the first vector; and a second device, configured to input to-be-matched second data into the pre-trained vector transformation model to obtain a second vector corresponding to the second data, and generate a first random vector based on an OT protocol, where: the first device is further configured to obtain a first intermediate vector through the OT protocol, and based on the first intermediate vector and a first predefined algorithm, obtain a first distance intermediate result, where the first intermediate vector is generated based on the binary vector corresponding to the first vector, the second vector, and the first random vector, the second device is further configured to generate a second distance intermediate result based on the second vector, the first random vector and a second predefined algorithm, and send the second distance intermediate result to the first device, and the first device is further configured to determine a target distance between the first vector and the second vector based on the first vector, the first distance intermediate result and the second distance intermediate result, and determine whether the first data and the second data match based on the target distance and a predefined first distance threshold.

In a sixth aspect, the disclosure provides an electronic device, including a processor and a memory, where the memory is configured to store program instructions, and the processor is configured to implement the steps of any of the above data matching methods when executing a computer program stored in the memory.

In a seventh aspect, the disclosure provides a computer-readable storage medium storing a computer program that, when executed by a processor, implements the steps of any of the above-mentioned data matching methods.

In the embodiments of the disclosure, the to-be-matched first data and second data may be respectively input into the pre-trained vector transformation model to obtain the first vector corresponding to the first data and the second vector corresponding to the second data, and the binary vector corresponding to the first vector may be obtained. The first intermediate vector may be generated based on the binary vector corresponding to the first vector, the second vector and the first random vector by using the OT protocol, and the first distance intermediate result may be obtained based on the first intermediate vector and the first predefined algorithm. The second distance intermediate result may be obtained based on the second vector, the first random vector and the second predefined algorithm. The target distance between the first vector and the second vector may be determined based on the first vector, the first distance intermediate result and the second distance intermediate result. Based on the target distance and a predefined first distance threshold, it is determined whether the first data and the second data match. That is, when the first data and the second data are not exactly the same, fuzzy matching of the first data and the second data may be achieved, which broadens the usage scenarios. In addition, the OT protocol is introduced in the fuzzy matching process to achieve secure intersection and ensure the security of the matching process. In the entire matching process, neither the first data nor the second data has left the corresponding first device and the second device in the form of raw data, which ensures the security of the first data and the second data, and achieves fuzzy matching without the raw data leaving the warehouse, further ensuring the security of the matching process.

BRIEF DESCRIPTION OF THE DRAWINGS

In order to more clearly illustrate the technical solutions in the embodiments of the present disclosure, the drawings essential for understanding the description of the embodiments will be briefly introduced below. Apparently, the drawings described below are merely some embodiments of the present disclosure. For a person skilled in the art, other drawings may be obtained based on these drawings without making creative efforts.

DETAILED DESCRIPTION

In order to ensure that the data of both parties may be matched even when they are not completely identical and to broaden the service scope of data matching, the embodiments of the disclosure provide a data matching method, apparatus, system, device and medium.

In order to make the purpose and implementation methods of the disclosure clearer, the exemplary implementation methods of the disclosure will be clearly and thoroughly described below in conjunction with the drawings in the exemplary embodiments of the disclosure. Apparently, the described exemplary embodiments are merely part of the embodiments of the disclosure, rather than all the embodiments.

It should be noted that the brief description of terms in the disclosure is merely for the convenience of understanding the embodiments described below, and is not intended to limit the embodiments of the disclosure. Unless otherwise specified, these terms should be understood according to their usual and general meanings.

The terms "first", "second", "third", etc., in the specification and claims of the disclosure and the above drawings are used to distinguish same or similar objects or entities, and do not necessarily mean to limit a specific order or sequence, unless otherwise noted. It should be understood that the terms used in this way may be interchangeable under appropriate circumstances.

The terms "comprise" and "include" and any variations thereof are intended to cover non-exclusive inclusion. For example, a product or device comprising/including a list of components is not necessarily limited to all the components expressly listed but may include other components not expressly listed or inherent to such product or device.

The term "module" refers to any known or later developed hardware, software, firmware, artificial intelligence, fuzzy logic, or combination of hardware and/or software code that is capable of performing the functions associated with that element.

Further, it should be noted that the disclosed embodiments are merely used to illustrate the technical solutions of the disclosure, rather than to limit it. Although the disclosure has been described in detail with reference to the disclosed embodiments, those skilled in the art should understand that they may still modify the technical solutions described in the these embodiments, or replace some or all of the technical features therein with equivalents. However, these modifications or replacements do not cause the essence of the corresponding technical solutions to deviate from the scope of the technical solutions of the embodiments of the disclosure.

Embodiment 1

Figure 1:
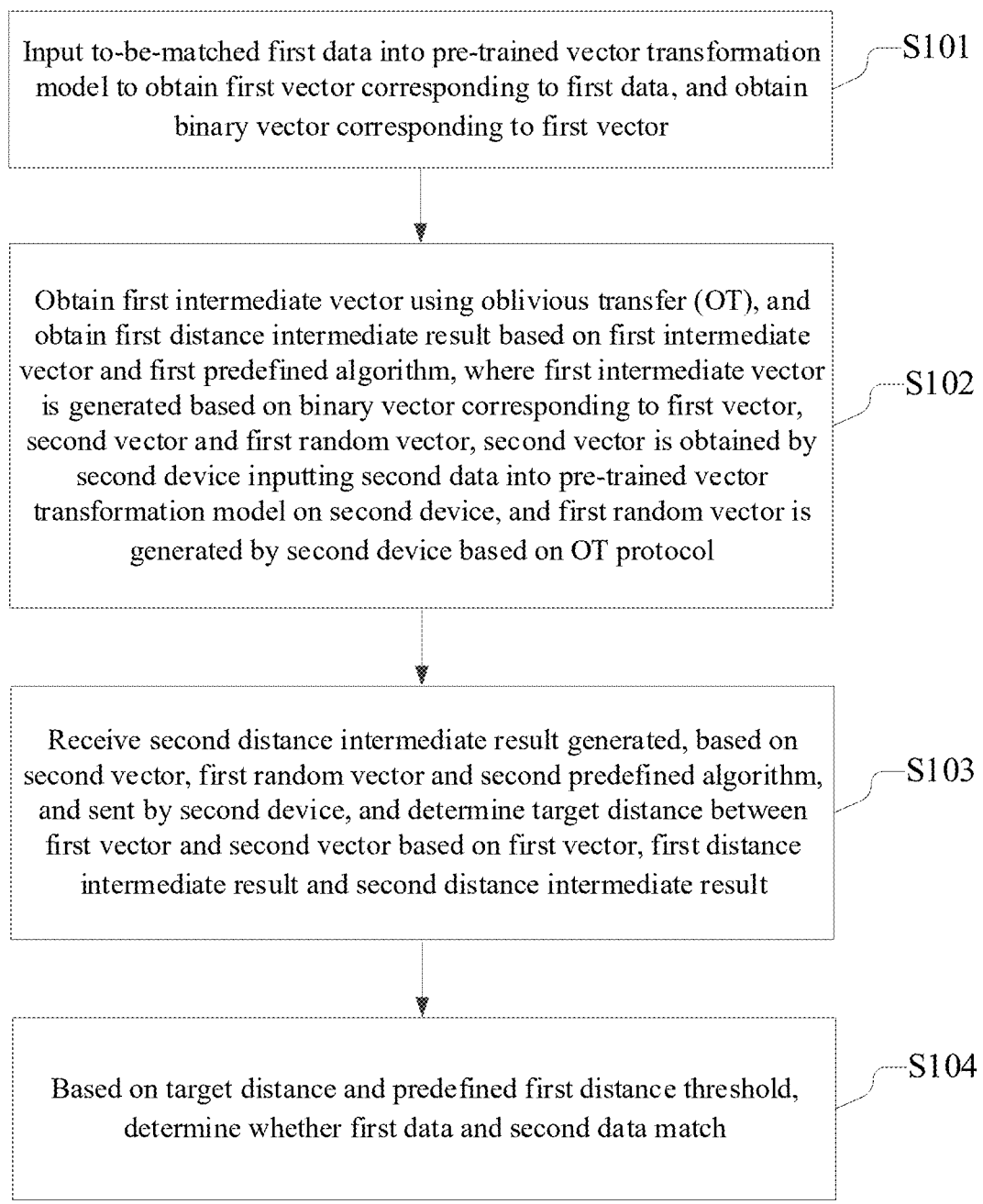
FIG. 1 is a schematic diagram of a first data matching process, according to some embodiments of the disclosure.

FIG. 1 is a schematic diagram of a first data matching process, according to some embodiments of the disclosure, and the process includes the following steps.

S101: Input to-be-matched first data into a pre-trained vector transformation model to obtain a first vector corresponding to the first data, and obtain a binary vector corresponding to the first vector.

The data matching method in the embodiments disclosed herein is applied to an electronic device, which is referred to as a first device for ease of description. The first device may be a smart terminal, a PC, a server or other devices.

In order to ensure that fuzzy matching may be achieved even when the data of both parties are not exactly the same, in some embodiments of the disclosure, a pre-trained vector transformation model is deployed in the first device. The pre-trained vector transformation model is configured to obtain a vector corresponding to the to-be-matched data. For different data, the dimensions of the vectors output by the pre-trained vector transformation model may be the same.

In some embodiments, in order to obtain the first vector (for ease of description, the vector corresponding to the first data is referred to as the first vector) corresponding to the to-be-matched first data (for ease of description, the to-be-matched data stored in the first device is referred to as the first data), the first data may be input into the pre-trained vector transformation model, and the pre-trained vector transformation model may output the first vector corresponding to the first data. Optionally, each component in the first vector may be a number, that is, the first data may be quantized by the pre-trained vector transformation model. Exemplarily, taking the first data as "Qingmou store in Moudongxin district of Mouhai city", the first data "Qingmou store in Moudongxin district of Mouhai city" may be input into the pre-trained word embedding model, and the first vector corresponding to the output of the first data "Qingmou store in Moudongxin district of Mouhai city" may be (1.0, 2.0, 1.5, 2.0, 3.5).

In some embodiments, in order to ensure that fuzzy matching may be achieved even when the data of both parties are not exactly the same, after obtaining the first vector corresponding to the first data, the first vector may be converted into a binary vector. Exemplarily, assuming that the first vector corresponding to the first data U1 is $(x_1, x_2, x_3 \ldots, x_m)$, the first vector contains m first components $(x_i)$, where i is any positive integer not greater than m. Each decimal first component $(x_i)$ may be converted into a binary vector (binary 0-1 sequence). That is, $(x_i)_{10}$ is converted into $(a_0 a_1 a_2 \ldots a_j \ldots a_p)_2$, $(x_i)_{10} = (a_0 a_1 a_2 \ldots a_j \ldots a_p)_2$, where $(x_i)_{10}$ represents the decimal first component, and $(a_0 a_1 a_2 \ldots a_j \ldots a_p)_2$ represents the binary vector corresponding to the first component. Each binary vector contains p binary components $a_j$, where j is any positive integer not greater than p, $a_j \in (0,1)$, then $$x_i = \sum_{j=0}^{p} 2^{p-j} a_j.$$

After each first component in the first vector is converted into a corresponding binary vector, the binary vector corresponding to the first vector is obtained. The binary vector corresponding to the first vector may be considered as a binary vector set composed of the binary vectors corresponding to each first component.

S102: Obtain a first intermediate vector using an oblivious transfer (OT), and obtain a first distance intermediate result based on the first intermediate vector and a first predefined algorithm, where the first intermediate vector is generated based on a binary vector corresponding to the first vector, a second vector and a first random vector, the second vector is obtained by a second device inputting second data into the pre-trained vector transformation model on the second device, and the first random vector is generated by the second device based on the OT protocol.

In some embodiments, in order to ensure that fuzzy matching may be achieved when the data of both parties are not completely identical and to ensure the security of the matching process, the first device may obtain a first intermediate vector through the OT protocol. Each first intermediate component contained in the first intermediate vector may be: $a_j y_j + C_j$. The OT protocol may be a 1-out-2 OT protocol. The first device may be used as the input entity of the OT protocol, and the second device may be used as the output entity of the OT protocol. $C_j$ is the first random component contained in the random vector (random number) generated by the second device based on the OT protocol. For ease of description, the random vector generated by the second device is referred to as the first random vector. In some embodiments, in order to achieve fuzzy matching of the first data and the second data, the pre-trained vector transformation model is also deployed in the second device to obtain the second vector (for ease of description, the vector corresponding to the second data is referred to as the second vector) corresponding to the to-be-matched second data (for ease of description, the to-be-matched data in the second device is referred to as the second data). Optionally, the second data may be input into the pre-trained vector transformation model, and the pre-trained vector transformation model may output the second vector corresponding to the second data. Assume that the second vector corresponding to the second data U5 is $(y_1, y_2, y_3 \ldots, y_m)$, and the second vector contains m second components $y_i$, where i is any positive integer not greater than m. The number of components contained in the first vector is the same as the number of components contained in the second component, that is, the length of the first vector is equal to the length of the second vector, and the lengths of the first vector and the second vector may both be a predefined length m, where m may be any positive integer. Since the length of the first vector corresponding to the first data is equal to the length of the second vector corresponding to the second data, fuzzy matching may be achieved even if the first data and the second data are different, which broadens the usage scenarios.

In some embodiments, each first intermediate component included in the first intermediate vector may be: $a_j y_j + C_j$. It may be understood that, when $a_j = 0$, the first intermediate component $a_j y_j + C_j$ acquired by the first device is $C_j$; and when $a_j = 1$, the first intermediate component $a_j y_j + C_j$ acquired by the first device is $y_i + C_j$.

After obtaining the first intermediate vector, the first device may obtain a first distance intermediate result based on the first intermediate vector and the first predefined algorithm. In some embodiments, the first distance intermediate result may be obtained by using the following process.

For each first component $x_i$ in the first vector, the product $(x_i \, y_i)$ of the first component and the corresponding second component may be determined based on each binary component $a_j$ corresponding to the first component and the corresponding second component $y_i$ in the second vector. A first random component sub-value $$\left(\text{e.g.,} -2\sum\nolimits_{j=0}^{p} 2^{p-j} C_j\right)$$

corresponding to the first component may be determined based on the corresponding first random component $C_j$ in the first random vector and the position information (e.g., p-j and the like) of the first random component in the corresponding binary vector. A first distance intermediate result may be determined based on the product $(x_i \, y_i)$ of the first component and the corresponding second component and the sum of the first random component sub-values.

For ease of understanding, the process of determining the first distance intermediate result based on the first intermediate vector and the first predefined algorithm is explained in the form of a formula. Assuming that the first distance intermediate result is represented by E(a), then $$E(a) = \sum\nolimits_{i=1}^{m}\left\{-2*\left[\sum\nolimits_{j=0}^{p} 2^{p-j}(a_j y_i + C_j)\right]\right\} = \sum\nolimits_{i=1}^{m}\left\{-2*\left[\sum\nolimits_{j=0}^{p} 2^{p-j} a_j y_i + \sum\nolimits_{j=0}^{p} 2^{p-j} C_j\right]\right\}$$
$$= \sum\nolimits_{i=1}^{m}\left\{-2*\left[x_i y_i + \sum\nolimits_{j=0}^{p} 2^{p-j} C_j\right]\right\}$$
$$= \sum\nolimits_{i=1}^{m}\left(-2x_i y_i - 2\sum\nolimits_{j=0}^{p} 2^{p-j} C_j\right).$$

S103: Receive a second distance intermediate result generated, based on the second vector, the first random vector and a second predefined algorithm, and sent by the second device, and determine a target distance between the first vector and the second vector based on the first vector, the first distance intermediate result and the second distance intermediate result.

In some embodiments, in order to ensure that fuzzy matching may be achieved even when the data of both parties are not completely identical and to ensure the security of the matching process, the second device may generate a second distance intermediate result based on the second vector, the first random vector and the second predefined algorithm. In some embodiments, the second distance intermediate result may be obtained by the following process.

For each second component $y_i$ in the second vector, determine the second square component $(y_i^2)$ of the second component; and based on the corresponding first random component $C_j$ in the first random vector and the position information (e.g., p-j and the like) of the first random component in the corresponding binary vector, determine a second random component sub-value $$\left(\text{e.g.,} \sum\nolimits_{j=0}^{p} 2^{p-j+1} C_j\right)$$

corresponding to the second component; and based on the sum of the second square component and the second random component sub-value, determine the second distance intermediate result.

For ease of understanding, the process of generating the second distance intermediate result based on the second vector, the first random vector and the second predefined algorithm is explained in the form of a formula below. Assuming that the second distance intermediate result is represented by E(b), then:

$$E(b) = \sum\nolimits_{i=1}^{m}\left(y_i^2 + \sum\nolimits_{j=0}^{p} 2^{p-j+1} C_j\right).$$

The second device may send the second distance intermediate result E(b) to the first device. The first device may further determine the target distance between the first vector and the second vector based on the first vector, the first distance intermediate result, and the second distance intermediate result (for ease of description, the distance between the first vector and the second vector is referred to as the target distance). Optionally, the process of determining the target distance between the first vector and the second vector based on the first vector, the first distance intermediate result, and the second distance intermediate result may be as follows.

For each first component in the first vector, the first device may first determine a sub-distance $(x_i - y_i)^2$ corresponding to the first component based on the sum $(x_i^2 + E(a) + E(b))$ of the first square component $x_i^2$ of the first component and the first distance intermediate result E(a) and the second distance intermediate result E(b), and then determine the target distance between the first vector and the second vector based on the sum of the sub-distances corresponding to each first component.

For example, the process of calculating the sum of the sub-distances corresponding to each first component may be as follows:

$$\sum_{i=1}^{m}(x_i^2) + E(a) + E(b) = \sum_{i=1}^{m}(x_i^2) + \sum_{i=1}^{m}\left(-2x_i y_i - 2\sum_{j=0}^{p} 2^{p-j}C_j\right) + \sum_{i=1}^{m}\left(y_i^2 + \sum_{j=0}^{p} 2^{p-j+1}C_j\right)$$
$$= \sum_{i=1}^{m}(x_i^2) - 2\sum_{i=1}^{m}(x_i y_i) + \sum_{i=1}^{m}(y_i^2)$$
$$= \sum_{i=1}^{m}(x_i - y_i)^2.$$

The target distance between the first vector and the second vector may be calculated based on the sub-distance $$\left(\sum_{i=1}^{m}(x_i - y_i)^2\right)$$

corresponding to each first component and the Euclidean distance formula. Exemplarily, the target distance between the first vector and the second vector $$d = \sqrt{\sum_{i=1}^{m}(x_i - y_i)^2}.$$

In some embodiments, the distance between the first vector and the second vector may be determined based on a cosine distance formula or a Hamming distance formula, etc., which will not be described in detail here.

S104: Based on the target distance and a predefined first distance threshold, determine whether the first data and the second data match.

In some embodiments, in order to determine whether the first data matches the second data, after determining the target distance between the first vector and the second vector, the target distance may be compared with a predefined first distance threshold. Based on the comparison result, it is determined whether the first data matches the second data. Exemplarily, it may be determined whether the target distance between the first vector and the second vector is less than the predefined first distance threshold. If the target distance between the first vector and the second vector is less than the predefined first distance threshold, it may be considered that the first data matches the second data. If the target distance between the first vector and the second vector is not less than the predefined first distance threshold, it may be determined that the first data does not match the second data. Optionally, the predefined first distance threshold may be 1, 1.5, etc. The disclosure does not specifically limit the predefined first distance threshold, which may be flexibly set according to actual needs. Here, the smaller the target distance between the first vector and the second vector, the better the first vector matches the second vector.

In order to determine whether the second data completely matches the first data, in some embodiments, it is also possible to determine whether the target distance between the first vector and the second vector is equal to a preset second distance threshold. If the target distance is equal to the preset second distance threshold, it may be considered that the first data is the same as the second data, that is, the first data completely matches the second data. Optionally, the second distance threshold may be less than the first distance threshold, and the second distance threshold may be 0.

In the embodiments of the disclosure, the to-be-matched first data and second data may be respectively input into the pre-trained vector transformation model to obtain the first vector corresponding to the first data and the second vector corresponding to the second data, and the binary vector corresponding to the first vector may be obtained. The first intermediate vector may be generated based on the binary vector corresponding to the first vector, the second vector and the first random vector by using the OT protocol, and the first distance intermediate result may be obtained based on the first intermediate vector and the first predefined algorithm. The second distance intermediate result may be obtained based on the second vector, the first random vector and the second predefined algorithm. The target distance between the first vector and the second vector may be determined based on the first vector, the first distance intermediate result and the second distance intermediate result. Based on the target distance and a predefined first distance threshold, it is determined whether the first data and the second data match. That is, when the first data and the second data are not exactly the same, fuzzy matching of the first data and the second data may be achieved, which broadens the usage scenarios. In addition, the OT protocol is introduced in the fuzzy matching process to achieve secure intersection and ensure the security of the matching process. In the entire matching process, neither the first data nor the second data has left the corresponding first device and the second device in the form of raw data, which ensures the security of the first data and the second data, and achieves fuzzy matching without the raw data leaving the warehouse, further ensuring the security of the matching process.

Embodiment 2

In order to determine the first vector corresponding to the first data, based on the above embodiments, in the embodiments of the disclosure, inputting the to-be-matched first data into the pre-trained vector transformation model to obtain the first vector corresponding to the first data includes the following.

Determine a first target data type corresponding to the first data.

Determine a pre-trained first target vector transformation model corresponding to the first data according to the first target data type and a pre-stored correspondence between data types and pre-trained vector transformation models.

Input the first data into the pre-trained first target vector transformation model to obtain the first vector corresponding to the first data.

In some embodiments of the disclosure, the to-be-matched first data may be text data, such as name, gender, address, and so on, or may be numerical data, such as identity card number, bank card number, admission ticket number, and so on, or may be image data, such as image used for face recognition, and so on. Therefore, in order to obtain the corresponding first vector, for the first data of different data types, the pre-trained vector transformation models may also be different.

Specifically, the correspondence between data types and pre-trained vector transformation models may be saved in the first device, and according to the first target data type corresponding to the to-be-matched first data, the corresponding pre-trained vector transformation model is used to obtain the first vector corresponding to the first data. Here, the corresponding pre-trained vector transformation model is the pre-trained first target vector transformation model.

The disclosure does not specifically limit the first target data type corresponding to the first data. For example, the first target data type may be a text type, a numerical type, an image type, etc. In addition, the disclosure does not specifically limit the vector transformation models corresponding to the data types, which may be flexibly set according to actual needs.

Exemplarily, in order to accurately determine the vector transformation model for converting the first data into the first vector, on the basis of the above embodiments, in some embodiments of the disclosure, if the first target data type is a text type, then the pre-trained first target vector transformation model corresponding to the first target data type may be a word embedding model or a sentence embedding model. If the first target data type is a numeric type, then the pre-trained first target vector transformation model corresponding to the first target data type may be a one-hot encoding model. If the first target data type is an image type, then the pre-trained first target vector transformation model corresponding to the first target data type may be an image embedding model.

Specifically, if the first data is text data, that is, the first target data type of the first data is a text type, then according to the pre-stored correspondence between data types and pre-trained vector transformation models, a pre-trained first target vector transformation model corresponding to the first target data type may be determined. The first target vector transformation model may be a word embedding model or a sentence embedding model. Based on the pre-trained word embedding model or sentence embedding model, the first vector corresponding to the first data may be obtained.

In some embodiments, if the first data is numerical data, that is, the first target data type of the first data is a numerical type, then based on the pre-stored correspondence between data types and pre-trained vector transformation models, a pre-trained first target vector transformation model corresponding to the first target data type may be determined, and the first target vector transformation model may be a pre-trained one-hot encoding model. Based on the pre-trained one-hot encoding model, the first vector corresponding to the first data may be obtained.

In some embodiments, if the first data is image data, that is, the first target data type of the first data is an image type, then based on the pre-stored correspondence between data types and pre-trained vector transformation models, a pre-trained first target vector transformation model corresponding to the first target data type may be determined, and the first target vector transformation model may be a pre-trained image embedding model (image vector embedding model). Based on the pre-trained image embedding model, the first vector corresponding to the first data may be obtained.

For ease of understanding, assume that the dimension of the vector output by the pre-trained vector transformation model is 5, and the pre-trained vector transformation model is a word embedding model. If the first data is text data, and the first data is "Qingmou store in Moudongxin district of Mouhai city", then "Qingmou store in Moudongxin district of Mouhai city" is input into the pre-trained word embedding model. The output first vector corresponding to "Qingmou store in Moudongxin district of Mouhai city" may be (1.0, 2.0, 1.5, 2.0, 3.5).

If the pre-trained vector transformation model is a one-hot encoding model, the corresponding one-hot encoding may be set for each number in advance. For example, the numbers include 0-9. For the numbers 0-9, the one-hot encoding corresponding to 0 is 0000000001, the one-hot encoding corresponding to 1 is 0000000010, the one-hot encoding corresponding to 2 is 0000000100, the one-hot encoding corresponding to 3 is 0000001000, the one-hot encoding corresponding to 4 is 0000010000, the one-hot encoding corresponding to 5 is 0000100000, the one-hot encoding corresponding to 6 is 0001000000, the one-hot encoding corresponding to 7 is 0010000000, the one-hot encoding corresponding to 8 is 0100000000, and the one-hot encoding corresponding to 9 is 1000000000. The numerical data is input into the one-hot encoding model, and each first component in a first vector output by the one-hot encoding model is a one-hot encoding of each corresponding number in the first data.

Exemplarily, if the first data is numerical data, and the numerical data is "12345", then "12345" is input into a pre-trained one-hot encoding model, and the output first vector corresponding to the "12345" is (0000000010, 0000000100, 000001000, 0000010000, 0000100000).

Here, when training a vector transformation model, each data and the corresponding annotation vector of the data may be pre-labeled, and each data and the corresponding annotation vector may be input into an original vector transformation model. According to the predicted vector output by the original vector transformation model and the corresponding annotation vector, the parameters of the original vector transformation model are adjusted. When the convergence conditions are met, it is determined that the training of the vector transformation model is completed.

In the embodiments of the disclosure, no matter whether the first data and the second data are numerical data or text data, fuzzy matching may be achieved, further broadening the application scenarios.

Embodiment 3

In order to enable the second device to also determine whether the first data and the second data match, on the basis of the above embodiments, in the embodiments of the disclosure, after determining the target distance between the first vector and the second vector, the method further includes the following.

Send the target distance to the second device, so that the second device determines whether the first data and the second data match based on the target distance and the predefined first distance threshold.

In some embodiments, in order to enable the second device to also determine whether the first data matches the second data, the first device may send the determined target distance between the first vector and the second vector to the second device. After receiving the target distance between the first vector and the second vector sent by the first device, the second device may determine whether the first data matches the second data based on the target distance and the predefined first distance threshold. The process of the second device determining whether the first data and the second data match may be the same as the process of the first device determining whether the first data and the second data match in the above embodiments, which will not be repeated here.

In some embodiments, after the first device determines whether the first data matches the second data and obtains a comparison result indicating whether the first data matches the second data, the comparison result may be sent to the second device. Optionally, the second device may compare the comparison result determined by the first device with the comparison result determined by itself to further improve the accuracy. In addition, in some embodiments, the second device may not determine whether the first data matches the second data and obtain a comparison result, and directly use the comparison result determined by the first device, thereby saving energy consumption.

Embodiment 4

In order to enable the second device to also determine the target distance between the first vector and the second vector, based on the above embodiments, the method further includes the following.

Based on the OT protocol, generate a third distance intermediate result based on the first vector, a second random vector and a second predefined algorithm.

Send the third distance intermediate result to the second device, so that the second device determines the target distance between the first vector and the second vector based on the second vector, the third distance intermediate result and a fourth distance intermediate result, and the second device determines whether the first data and the second data match based on the target distance and the predefined first distance threshold, where the fourth distance intermediate result is obtained based on a second intermediate vector and the first predefined algorithm, the second intermediate vector is obtained through the OT protocol, and the second intermediate vector is generated based on a binary vector corresponding to the second vector, the first vector and the second random vector.

In some embodiments, in order to enable the second device to determine the target distance between the first vector and the second vector without relying on the first device to send the determined target distance to the second device, and to further improve security, the first device may also generate a random vector (referred to as a second random vector for ease of description) based on the OT protocol. The first device may also generate a third distance intermediate result based on the first vector, the second random vector, and the second predefined algorithm. The process of the first device generating the third distance intermediate result is similar to the process of the second device generating the second distance intermediate result. In some embodiments, the third distance intermediate result may be obtained using the following process.

For each first component $x_1$ in the first vector, determine the first square component $(x_i^2)$ of the first component; and based on a corresponding second random component $C_j'$ in the second random vector and position information (e.g., p-j and the like) of the second random component in the corresponding binary vector, determine a third random component sub-value $$\left(\text{e.g., } \sum_{j=0}^{p} 2^{p-j+1} C_j'\right)$$

) corresponding to the first component; and based on the sum of the first square component and the third random component sub-value, determine the third distance intermediate result.

For ease of understanding, the process of generating the third distance intermediate result based on the first vector, the second random vector and the second predefined algorithm is explained in the form of a formula. Assuming that the third distance intermediate result is represented by $E(a)'$, then:

$$E(a)' = \sum_{i=1}^{m}\left(x_i^2 + \sum_{j=0}^{p} 2^{p-j+1} C_j\right).$$

In some embodiments, in order to ensure that fuzzy matching may be achieved even when the data of both parties are not completely identical and to ensure the security of the matching process, after the second device obtains the second vector corresponding to the second data, the second vector may be converted into a binary vector. Exemplarily, assuming that the second vector corresponding to the second data U5 is $(y_1, y_2, y_3 \ldots, y_m)$, the second vector contains m second components $(y_i)$, where i is any positive integer not greater than m. Each decimal second component $(y_i)$ may be converted into a binary vector (binary 0-1 sequence). That is, $(y_i)_{10}$ is converted into $(b_0 b_1 b_2 \ldots b_j \ldots b_p)_2$, $(y_i)_{10}=(b_0 b_1 b_2 \ldots b_j \ldots b_p)_2$, where $(y_i)_{10}$ represents the decimal second component, $(b_0 b_1 b_2 \ldots b_j \ldots b_p)_2$ represents the binary vector corresponding to the second component. Each binary vector contains p binary components $b_j$, where j is any positive integer not greater than p, $b \in (0,1)$, then $$y_i = \sum_{j=0}^{p} 2^{p-j} b_j.$$

After each second component in the second vector is converted into a corresponding binary vector, the binary vector corresponding to the second vector is obtained, and the binary vector corresponding to the second vector may be considered as a binary vector set composed of the binary vectors corresponding to each second component.

The second device may obtain the second intermediate vector through the OT protocol, and each second intermediate component contained in the second intermediate vector may be: $b_j x_i + C_j'$. The OT protocol may be a 1-out-2 OT protocol, the second device may be used as the input entity of the OT protocol, and the first device may be used as the output entity of the OT protocol. $C_j'$ is the second random component contained in the random vector (random number) generated by the first device based on the OT protocol. It may be understood that when $b_j=0$, the second intermediate component obtained by the second device is $b_j x_i + C_j'$ is $C_j'$; and when $b_j=1$, the first intermediate component obtained by the first device is $b_j x_i + C_j'$ is $x_i + C_j'$.

After obtaining the second intermediate vector, the second device may obtain a fourth distance intermediate result based on the second intermediate vector and the first predefined algorithm. The process by which the second device obtains the fourth distance intermediate result is similar to the process by which the first device obtains the first distance intermediate result in the above embodiments. Specifically, the fourth distance intermediate result may be obtained by the following process.

For each second component $y_i$ in the second vector, the product $(x_i y_i)$ of the second component and the corresponding first component $x_i$ may be determined based on each binary component $b_j$ corresponding to the second component and the corresponding first component in the first vector. A fourth random component sub-value $$\left(\text{e.g.,} -2\sum_{j=0}^{p} 2^{p-j} C'_j\right)$$

corresponding to the second component may be determined based on the corresponding second random component $C_j'$ in the second random vector and the position information (e.g., p-j and the like) of the second random component in the corresponding binary vector. The fourth distance intermediate result may be determined based on the product $(x_i \, y_i)$ of the second component and the corresponding first component and the sum of the fourth random component sub-values.

For ease of understanding, the process of determining the fourth distance intermediate result based on the second intermediate vector and the first predefined algorithm is explained in the form of a formula. Assuming that the fourth distance intermediate result is represented by E(b)', then $$E(b)' = \sum_{i=1}^{m} \left\{ -2 * \left[ \sum_{j=0}^{p} 2^{p-j}(b_j x_i + C'_j) \right] \right\}$$
$$= \sum_{i=1}^{m} \left\{ -2 * \left[ \sum_{j=0}^{p} 2^{p-j} b_j x_i + \sum_{j=0}^{p} 2^{p-j} C'_j \right] \right\}$$
$$= \sum_{i=1}^{m} \left\{ -2 * \left[ x_i y_i + \sum_{j=0}^{p} 2^{p-j} C'_j \right] \right\}$$
$$= \sum_{i=1}^{m} \left( -2 x_i y_i - 2 \sum_{j=0}^{p} 2^{p-j} C'_j \right).$$

In some embodiments, the first device may send the determined third distance intermediate result E(a)' to the second device. The second device may further determine the target distance between the first vector and the second vector based on the second vector, the third distance intermediate result, and the fourth distance intermediate result. Optionally, the process of determining the target distance between the first vector and the second vector based on the second vector, the third distance intermediate result, and the fourth distance intermediate result may be as follows.

For each second component in the second vector, the second device may first determine a sub-distance $(x_i-y_i)^2$ corresponding to the second component based on the sum $(y_i^2+E(a)'+E(b)')$ of the second square component y of the second component, the third distance intermediate result E(a)' and the fourth distance intermediate result E(b)', and then determine the target distance between the first vector and the second vector based on the sum of the sub-distances corresponding to each second component.

For example, the process of calculating the sum of the sub-distances corresponding to each second component may be as follows:

corresponding to each second component and the Euclidean distance formula. Exemplarily, the target distance between the first vector and the second vector is $$d = \sqrt{\sum_{i=1}^{m}(x_i - y_i)^2}.$$

After determining the target distance between the first vector and the second vector, it is also possible to determine whether the first data and the second data match based on the target distance and the predefined first distance threshold, where the process of determining whether the first data and the second data match may be the same as the process of the first device determining whether the first data and the second data match in the above embodiments, which will not be repeated here.

Figure 2:
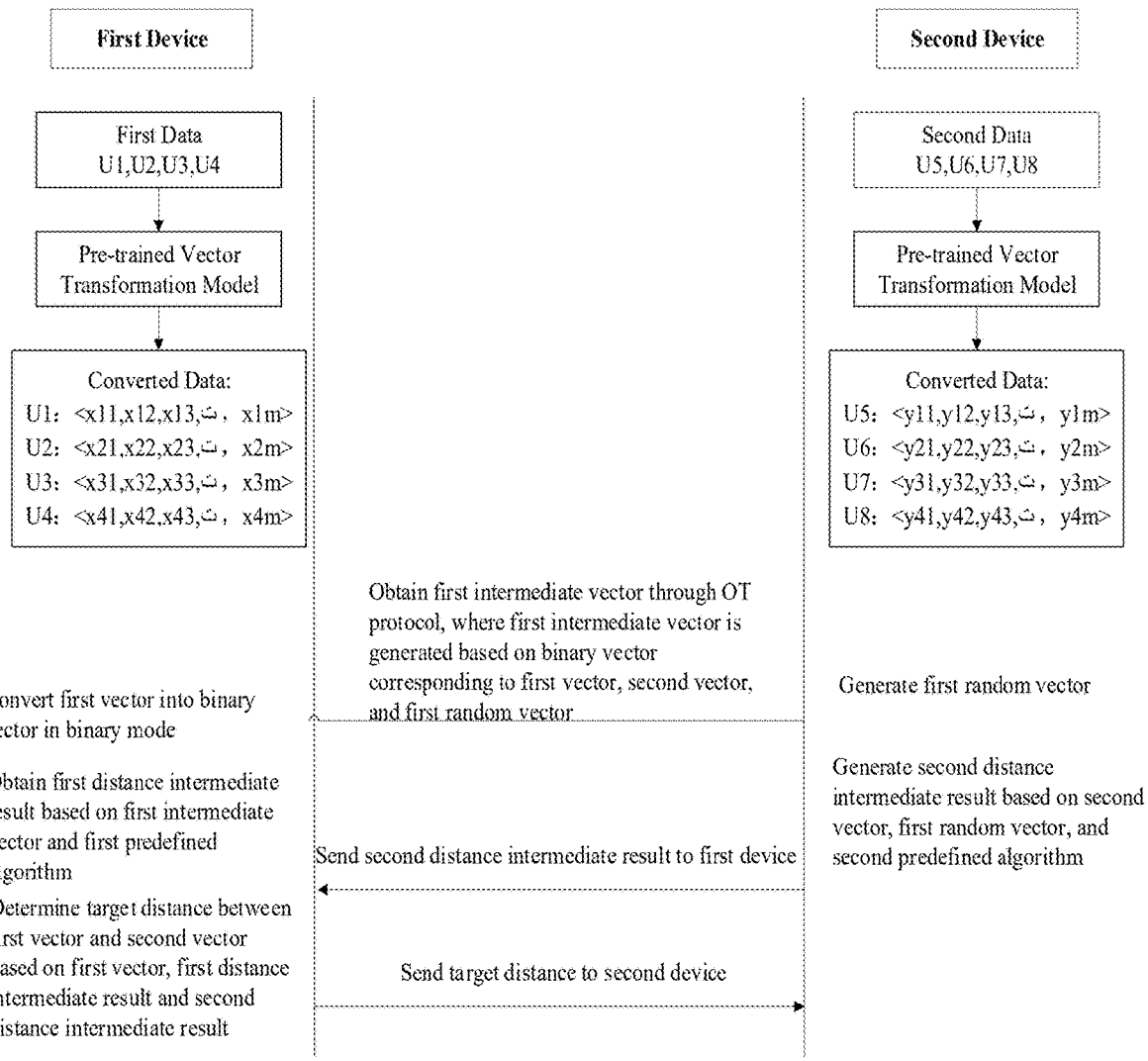
FIG. 2 is a schematic diagram of a second data matching process, according to some embodiments of the disclosure.

For ease of understanding, the data matching process provided by the disclosure is described below through a specific embodiment. FIG. 2 is a schematic diagram of a second data matching process according to some embodiments of the disclosure. As shown in FIG. 2, the process includes the following operations.

The first device inputs each to-be-matched first data into the pre-trained vector transformation model deployed in the first device, and obtains the first vector corresponding to each first data. Similarly, the second device inputs each to-be-matched second data into the pre-trained vector transformation model deployed in the second device, and obtains the second vector corresponding to each second data. As shown in FIG. 2, there are 4 first data, namely U1, U2, U3, and U4, and the first vector corresponding to U1 is (x11, x12, x13 . . . , x1m), the first vector corresponding to U2 is (x21, x22, x23 . . . , x2m), the first vector corresponding to U3 is (x31, x32, x33 . . . , x3m), and the first vector corresponding to U4 is (x41, x42, x43 . . . , x4m). In addition, there are 4 second data, namely U5, U6, U7, and U8, and the second vector corresponding to U5 is (y11, y12, y13 . . . , y1m), the second vector corresponding to U6 is (y21, y22, y23 . . . , y2m), the second vector corresponding to U7 is (y31, y32, y33 . . . , y3m), and the second vector corresponding to U8 is (y41, y42, y43 . . . , y4m).

For each first vector, the first device converts the first vector into a binary vector to obtain a binary vector corresponding to the first vector. The second device generates a first random vector based on the OT protocol.

Since for each first data, it is necessary to determine whether the first data matches each second data, for example, for the first data U1, it is necessary to determine whether the first data U1 matches the second data U5, $$\sum_{i=1}^{m}(y_i^2) + E(a)' + E(b)' = \sum_{i=1}^{m}(y_i^2) + \sum_{i=1}^{m}\left(-2x_i y_i - 2\sum_{j=0}^{p} 2^{p-j} C'_j\right) + \sum_{i=1}^{m}\left(x_i^2 + \sum_{j=0}^{p} 2^{p-j+1} C'_j\right)$$
$$= \sum_{i=1}^{m}(x_i^2) - 2\sum_{i=1}^{m}(x_i y_i) + \sum_{i=1}^{m}(y_i^2)$$
$$= \sum_{i=1}^{m}(x_i - y_i)^2.$$

The target distance between the first vector and the second vector may be calculated based on the sub-distance $$\left(\sum_{i=1}^{m}(x_i - y_i)^2\right)$$

whether the first data U1 matches the second data U6, whether the first data U1 matches the second data U7, and whether the first data U1 matches the second data U8. Therefore, for each first vector, the target distance between the first vector and each second vector may be determined, where the process of determining the target distance between any first vector and each second vector is the same as the process of calculating the target distance in the above embodiments. For example, for each first vector, the first device obtains a first intermediate vector through the OT protocol, and obtains a first distance intermediate result based on the first intermediate vector and the first predefined algorithm. The first intermediate vector is generated based on the binary vector corresponding to the first vector, the second vector and the first random vector. The second device generates a second distance intermediate result based on the second vector, the first random vector and the second predefined algorithm, and sends the second distance intermediate result to the first device. For each first vector, the first device determines the target distance between the first vector and the second vector based on the first vector, the first distance intermediate result and the second distance intermediate result, which will not be repeated here.

For each first vector, after determining the target distance between the first vector and each second vector respectively, the first device may also send the determined target distance to the second device. Both the first device and the second device may respectively determine whether the first data corresponding to the first vector matches the second data corresponding to each second vector based on the target distance and the predefined first distance threshold, that is, the first device and the second device may respectively determine whether each first data matches each second data.

For ease of understanding, the data matching process provided by the disclosure is described below through a specific example. Assume that there are three first data stored in the first device, namely "Qingmou store in Moudongxin district of Mouhai city", "Tianmou restaurant in Mouhai city", and "Yangmoufu spicy hot pot in Gaomou road". There are also three second data stored in the second device, namely "Qingmou store in Mouhai city", "Tianmou restaurant in Mouhai city", and "Maimoulao".

In the first data, the first vector corresponding to "Qingmou store in Moudongxin district of Mouhai city" is <1.0, 2.0, 1.5, 2.0, 3.5>, recorded as A1. The first vector corresponding to "Tianmou restaurant in Mouhai city" is <3.0, 4.0, 2.5, 2.5, 1.5>, recorded as A2. The first vector corresponding to "Yangmoufu spicy hot pot in Gaomou road" is <4.5, 5.5, 7.5, 1.5, 0.5>, recorded as A3.

In the second data, the second vector corresponding to "Qingmou store in Mouhai city" is <1.0, 2.0, 1.5, 1.0, 3.5>, recorded as B1. The second vector corresponding to "Tianmou restaurant in Mouhai city" is <3.0, 4.0, 2.5, 2.5, 1.5>, recorded as B2. The second vector corresponding to "Maimoulao" is <3.5, 6.5, 2.5, 7.5, 2.5>, recorded as B3.

For each first data, it is necessary to determine whether the first data matches each second data, therefore, for each first vector, a target distance between the first vector and each second vector may be determined, where the process of determining the target distance between the first vector and any second vector is the same as the process of calculating the target distance in the above embodiments, which will not be repeated here.

As shown in Table 1, Table 1 is a schematic table of target distances provided according to some embodiments of the disclosure.

TABLE 1

| D(x,y) | B1 | B2 | B3 |
|---|---|---|---|
| A1 | 1 | 3.64 | 7.66 |
| A2 | 3.9 | 0 | 5.7 |
| A3 | 8.35 | 5.61 | 8.18 |

Assume that $D(x,y)$ represents the target distance, where x represents the first vector and y represents the second vector. The target distance between A1 and B1 is 1, the target distance between A1 and B2 is 3.64, the target distance between A1 and B3 is 7.66, the target distance between A2 and B1 is 3.9, the target distance between A2 and B2 is 0, the target distance between A2 and B3 is 5.7, the target distance between A3 and B1 is 8.35, the target distance between A3 and B2 is 5.16, and the target distance between A3 and B3 is 8.18.

Assuming that the first distance threshold is 2, the result of this fuzzy matching is that the "Qingmou store in Moudongxin district of Mouhai city" in the first data matches the "Qingmou store in Mouhai city" in the second data, and the "Tianmou restaurant in Mouhai city" in the first data matches the "Tianmou restaurant in Mouhai city" in the second data. It can be seen from the above that the data matching methods in the disclosure may achieve fuzzy matching of data even when the two data are not exactly the same, thereby broadening the usage scenarios.

For ease of understanding, the data matching process provided by the disclosure is described below through another specific example. Assume that there are three first data stored in the first device, which are three mobile phone numbers "13345678909", "13245678911", and "13334536787". There are also three second data stored in the second device, which are three mobile phone numbers "13334536787", "13345678908", and "15439402290".

The first device and the second device may respectively use the one-hot encoding model (data conversion model) to vectorize the mobile phone numbers in the first data and the second data to generate corresponding first vectors and second vectors. Optionally, the vector dimensions of the first vector and the second vector may be 10*11, where 10 represents 10 digits from 0 to 9, and 11 represents that the length of the mobile phone numbers is 11 digits. For example, refer to Table 2, which is a vector diagram corresponding to the mobile phone number "13345678909".

TABLE 2

| One of the digits in the mobile phone number | Vector corresponding to the number (one-hot encoding) |
|---|---|
| 1 | 0000000010 |
| 3 | 0000001000 |
| 3 | 0000001000 |
| 4 | 0000010000 |
| 5 | 0000100000 |
| 6 | 0001000000 |
| 7 | 0010000000 |
| 8 | 0100000000 |
| 9 | 1000000000 |
| 0 | 0000000001 |
| 9 | 1000000000 |

Referring to Table 2, in some embodiments, the unique hot encoding corresponding to 0 is 0000000001, the unique hot encoding corresponding to 1 is 0000000010, the unique hot encoding corresponding to 2 is 0000000100, the unique hot encoding corresponding to 3 is 0000001000, the unique hot encoding corresponding to 4 is 0000010000, the unique hot encoding corresponding to 5 is 0000100000, the unique hot encoding corresponding to 6 is 0001000000, the unique hot encoding corresponding to 7 is 0010000000, the unique hot encoding corresponding to 8 is 0100000000, and the unique hot encoding corresponding to 9 is 1000000000. Then the first vector (or second vector) corresponding to the mobile phone number "13345678909" may be (0000000010,0000001000,0000001000, 0000010000, 000010000,000010000, 000100000, 0001000000, 00010000000, 00100000000, 10000000000, 0000000001, 1000000000). The process of determining the vectors corresponding to other mobile phone numbers is similar to this process and will not be repeated here.

For ease of description, the first vector corresponding to "13345678909" in the first data is recorded as A4, the first vector corresponding to "13245678911" is recorded as A5, and the first vector corresponding to "13334536787" is recorded as A6. The second vector corresponding to "13334536787" in the second data is recorded as B4, the second vector corresponding to "13345678908" is recorded as B5, and the second vector corresponding to "15439402290" is recorded as B6.

For each first data, it is necessary to determine whether the first data matches each second data, therefore, for each first vector, the target distance between the first vector and each second vector may be determined, where the process of determining the target distance between any first vector and any second vector is the same as the process of calculating the target distance in the above embodiments, which will not be repeated here.

As shown in Table 3, Table 3 is a schematic table of target distances provided in some embodiments of the disclosure.

TABLE 3

| D(x,y) | B4 | B5 | B6 |
|---|---|---|---|
| A4 | 2.82 | 1 | 3.16 |
| A5 | 3 | 1.73 | 3 |
| A6 | 0 | 2.82 | 3 |

Assume that D(x,y) represents the target distance, where x represents the first vector and y represents the second vector. The target distance between A4 and B4 is 2.82, the target distance between A4 and B5 is 1, the target distance between A4 and B6 is 3.16, the target distance between A5 and B4 is 3, the target distance between A5 and B5 is 1.73, the target distance between A5 and B6 is 3, the target distance between A6 and B4 is 0, the target distance between A6 and B5 is 2.83, and the target distance between A6 and B6 is 3.

Assuming that the first distance threshold is 2, the result of this fuzzy matching is that "13345678909" in the first data matches "13345678909" in the second data, and "13334536787" in the first data matches "13334536787" in the second data. It can be seen that the data matching methods in the present disclosure may not only realize fuzzy matching of data, but also realize precise matching of data, which broadens the usage scenarios.

Embodiment 5

Figure 3:
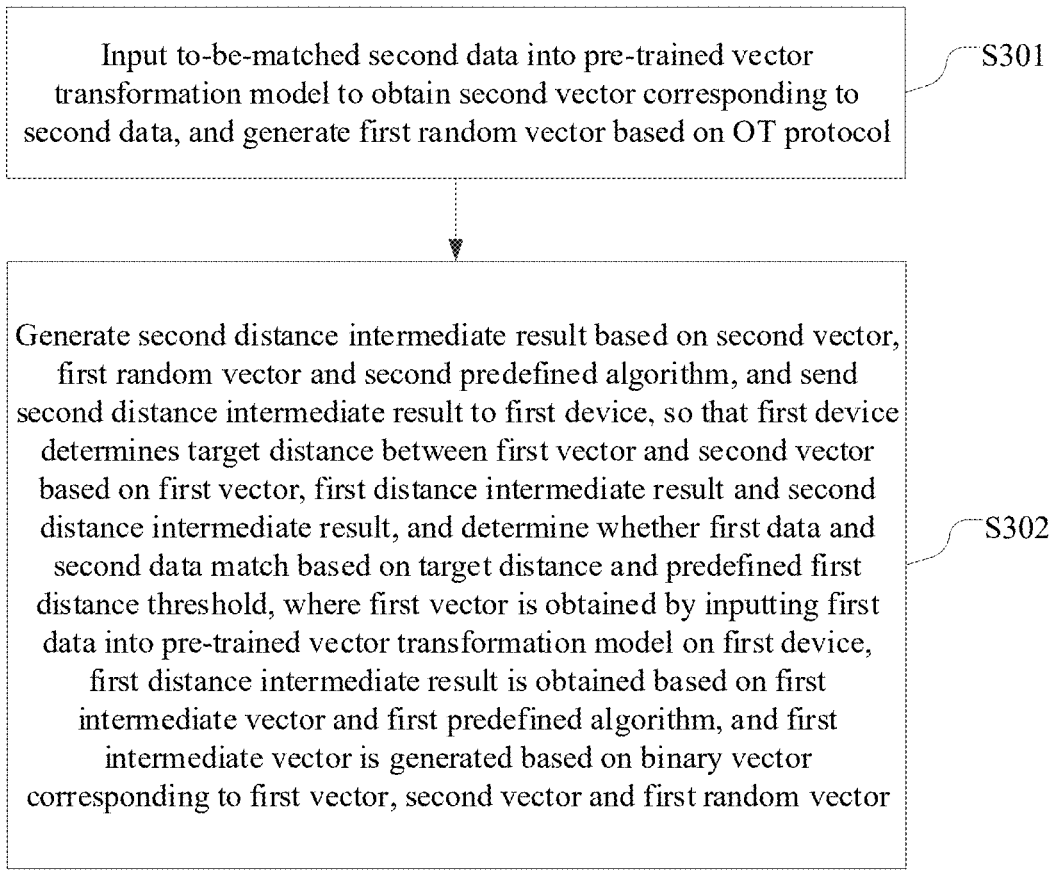
FIG. 3 is a schematic diagram of a third data matching process, according to some embodiments of the disclosure.

Based on similar technical concepts, the disclosure provides a data matching method, which is applied to a second device. FIG. 3 is a schematic diagram of a third data matching process according to some embodiments of the disclosure. As shown in FIG. 3, the method includes the following steps.

S301: Input to-be-matched second data into a pre-trained vector transformation model to obtain a second vector corresponding to the second data, and generate a first random vector based on an OT protocol.

The data matching method in the embodiments disclosed herein is applied to a second device, which may be a smart terminal, a PC, a server or other device, and the second device is a different device from the first device in the disclosure.

S302: Generate a second distance intermediate result based on the second vector, the first random vector and a second predefined algorithm, and send the second distance intermediate result to the first device, so that the first device determines the target distance between the first vector and the second vector based on the first vector, the first distance intermediate result and the second distance intermediate result, and determine whether the first data and the second data match based on the target distance and a predefined first distance threshold, where the first vector is obtained by inputting first data into the pre-trained vector transformation model on the first device, the first distance intermediate result is obtained based on a first intermediate vector and the first predefined algorithm, and the first intermediate vector is generated based on a binary vector corresponding to the first vector, the second vector and the first random vector.

In some embodiments, inputting the to-be-matched second data into the pre-trained vector transformation model to obtain the second vector corresponding to the second data includes the following.

Determine a second target data type corresponding to the second data.

Determine a pre-trained second target vector transformation model corresponding to the second data according to the second target data type and a pre-stored correspondence between data types and pre-trained vector transformation models.

Input the second data into the pre-trained second target vector transformation model to obtain the second vector corresponding to the second data.

In some embodiments, the second target data type is any one of a text type, a numerical type, or an image type.

In some embodiments, if the second target data type is a text type, the pre-trained second target vector transformation model corresponding to the second target data type is a word embedding model or a sentence embedding model. If the second target data type is a numeric type, the pre-trained second target vector transformation model corresponding to the second target data type is a one-hot encoding model. If the second target data type is an image type, the pre-trained second target vector transformation model corresponding to the second target data type is an image embedding model.

In some embodiments, the method further includes the following.

Receive a third distance intermediate result sent by the first device, where the third distance intermediate result is generated based on the first vector, a second random vector, and the second predefined algorithm, where the second random vector is generated by the first device based on the OT protocol; and obtain a second intermediate vector through the OT protocol, where the second intermediate vector is generated based on the binary vector corresponding to the second vector, the first vector, and the second random vector.

Acquire a fourth distance intermediate result based on the second intermediate vector and the first predefined algorithm.

Determine a target distance between the first vector and the second vector based on the second vector, the third distance intermediate result, and the fourth distance intermediate result.

Based on the target distance and the predefined first distance threshold, determine whether the first data and the second data match.

In some embodiments, after sending the second distance intermediate result to the first device, the method further includes the following.

Receive the target distance sent by the first device, and determine whether the first data and the second data match based on the target distance and the predefined first distance threshold.

In some embodiments, the method further includes the following.

Receive a comparison result, sent by the first device, indicating whether the first data matches the second data.

Embodiment 6

Figure 4:
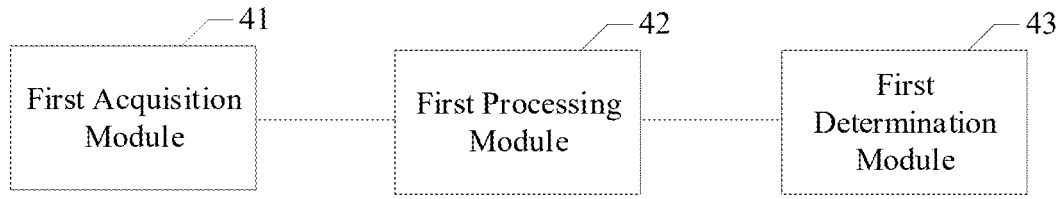
FIG. 4 is a schematic structural diagram of a data matching apparatus, according to some embodiments of the disclosure.

Based on similar technical concepts, the disclosure provides a data matching apparatus, which is applied to a first device. FIG. 4 is a schematic structural diagram of a data matching apparatus according to some embodiments of the disclosure. As shown in FIG. 4, the apparatus includes the following components.

A first acquisition module 41, configured to input to-be-matched first data into a pre-trained vector transformation model to obtain a first vector corresponding to the first data, and obtain a binary vector corresponding to the first vector.

A first processing module 42, configured to obtain a first intermediate vector through an OT protocol; and obtain a first distance intermediate result based on the first intermediate vector and a first predefined algorithm; where the first intermediate vector is generated based on a binary vector corresponding to the first vector, a second vector, and a first random vector, the second vector is obtained by the second device inputting second data into the pre-trained vector transformation model on the second device, and the first random vector is generated by the second device based on the OT protocol.

The first processing module 42 is further configured to receive a second distance intermediate result generated, based on the second vector, the first random vector and a second predefined algorithm, and sent by the second device; and determine a target distance between the first vector and the second vector based on the first vector, the first distance intermediate result and the second distance intermediate result.

A first determination module 43, configured to determine whether the first data and the second data match based on the target distance and a predefined first distance threshold.

In some embodiments, the first acquisition module 41 is specifically configured to determine a first target data type corresponding to the first data; determine a pre-trained first target vector transformation model corresponding to the first data according to the first target data type and a pre-stored correspondence between data types and pre-trained vector transformation models; and input the first data into the pre-trained first target vector transformation model to obtain the first vector corresponding to the first data.

In some embodiments, the first target data type is at least one of a text type, a numerical type, or an image type.

In some embodiments, if the first target data type is a text type, the pre-trained first target vector transformation model corresponding to the first target data type is a word embedding model or a sentence embedding model; if the first target data type is a numeric type, the pre-trained first target vector transformation model corresponding to the first target data type is a one-hot encoding model; and if the first target data type is an image type, the pre-trained second target vector transformation model corresponding to the first target data type is an image embedding model.

In some embodiments, the first processing module 42 is further configured to generate a second random vector based on the OT protocol; generate a third distance intermediate result based on the first vector, the second random vector and the second predefined algorithm; send the third distance intermediate result to the second device, so that the second device determines the target distance between the first vector and the second vector based on the second vector, the third distance intermediate result and a fourth distance intermediate result, and determines whether the first data and the second data match based on the target distance and the predefined first distance threshold, where the fourth distance intermediate result is obtained based on a second intermediate vector and the first predefined algorithm, the second intermediate vector is obtained through the OT protocol, and the second intermediate vector is generated based on a binary vector corresponding to the second vector, the first vector and the second random vector.

In some embodiments, the first processing module 42 is further configured to send the target distance to the second device, so that the second device determines whether the first data and the second data match based on the target distance and the predefined first distance threshold.

In some embodiments, the first processing module 42 is further configured to send a comparison result, indicating whether the first data and the second data match, to the second device.

In some embodiments, the lengths of the first vector and the second vector are both predefined lengths.

In some embodiments, the first distance intermediate result is obtained by using the following process.

For each first component in the first vector, based on each binary component corresponding to the first component and the corresponding second component in the second vector, determine a product of the first component and the corresponding second component; and based on the corresponding first random component in the first random vector and position information of the first random component in the corresponding binary vector, determine a first random component sub-value corresponding to the first component; based on the sum of the product and the first random component sub-value, determine the first distance intermediate result.

The second distance intermediate result is obtained by the following process.

For each second component in the second vector, determine the second square component of the second component; and based on the corresponding first random component in the first random vector and the position information of the first random component in the corresponding binary vector, determine a second random component sub-value corresponding to the second component; and based on the sum of the second square component and the second random component sub-value, determine the second distance intermediate result.

Determining the target distance between the first vector and the second vector based on the first vector, the first distance intermediate result, and the second distance intermediate result includes the following.

For each first component in the first vector, determine a first square component of the first component; based on the first square component of the first component, the product of the first component and the corresponding second component, the first random component sub-value, the second square component of the corresponding second component, and the second random component sub-value, determine a sub-distance corresponding to the first component.

Based on the sub-distance corresponding to each first component, determine the target distance between the first vector and the second vector.

In some embodiments, the third distance intermediate result is obtained by using the following process.

For each first component in the first vector, determine the first square component of the first component; and based on the corresponding second random component in the second random vector and the position information of the second random component in the corresponding binary vector, determine a third random component sub-value corresponding to the first component; and based on the sum of the first square component and the third random component sub-value, determine the third distance intermediate result.

The fourth distance intermediate result is obtained by the following process.

For each second component in the second vector, based on each binary component corresponding to the second component and the corresponding first component in the first vector, determine a product of the second component and the corresponding first component; and based on the corresponding second random component in the second random vector and the position information of the second random component in the corresponding binary vector, determine a fourth random component sub-value corresponding to the second component; and based on the sum of the product and the fourth random component sub-value, determine the fourth distance intermediate result.

Determining the target distance between the first vector and the second vector based on the second vector, the third distance intermediate result, and the fourth distance intermediate result includes the following.

For each second component in the second vector, determine a second square component of the second component; based on the second square component of the second component, the product of the second component and the corresponding first component, the third random component sub-value, the first square component of the corresponding first component, and the fourth random component sub-value, determine a sub-distance corresponding to the second component.

Based on the sub-distance corresponding to each second component, determine the target distance between the first vector and the second vector.

In some embodiments, the first determination module 43 is specifically configured to determine whether the target distance is less than the predefined first distance threshold. If the target distance is less than the predefined first distance threshold, determine that the first data matches the second data. If the target distance is not less than the predefined first distance threshold, determine that the first data does not match the second data.

In some embodiments, the first determination module 43 is further configured to determine whether the target distance is equal to a preset second distance threshold, and if the target distance is equal to the preset second distance threshold, determine that the first data is the same as the second data.

Embodiment 7

Figure 5:
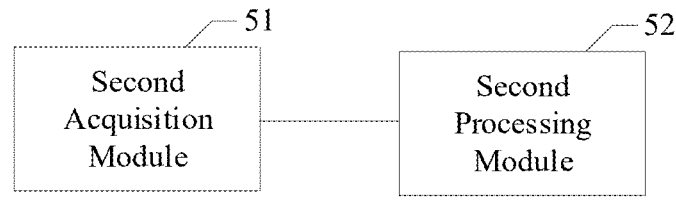
FIG. 5 is a schematic structural diagram of another data matching apparatus, according to some embodiments of the disclosure.

Based on similar technical concepts, the disclosure provides another data matching apparatus, which is applied to the second device. FIG. 5 is a schematic structural diagram of another data matching apparatus according to some embodiments of the disclosure. As shown in FIG. 5, the apparatus includes the following.

A second acquisition module 51, configured to input to-be-matched second data into a pre-trained vector transformation model to obtain a second vector corresponding to the second data; and generate a first random vector based on the OT protocol.

A second processing module 52, configured to generate a second distance intermediate result based on the second vector, the first random vector and a second predefined algorithm, and send the second distance intermediate result to the first device, so that the first device determines a target distance between the first vector and the second vector based on the first vector, a first distance intermediate result and the second distance intermediate result, and determines whether the first data and the second data match based on the target distance and a predefined first distance threshold, where the first vector is obtained by inputting the first data into a pre-trained vector transformation model on the first device, the first distance intermediate result is obtained based on the first intermediate vector and the first predefined algorithm, and the first intermediate vector is generated based on the binary vector corresponding to the first vector, the second vector and the first random vector.

In some embodiments, the second acquisition module 51 is specifically configured to determine a second target data type corresponding to the second data; determine a pre-trained second target vector transformation model corresponding to the second data according to the second target data type and a pre-stored correspondence between data types and pre-trained vector transformation models; and input the second data into the pre-trained second target vector transformation model to obtain the second vector corresponding to the second data.

In some embodiments, the second target data type is at least one of a text type, a numerical type, or an image type.

In some embodiments, if the second target data type is a text type, the pre-trained second target vector transformation model corresponding to the second target data type is a word embedding model or a sentence embedding model; if the second target data type is a numeric type, the pre-trained second target vector transformation model corresponding to the second target data type is a one-hot encoding model; and if the second target data type is an image type, the pre-trained second target vector transformation model corresponding to the second target data type is an image embedding model.

In some embodiments, the second processing module 52 is further configured to receive a third distance intermediate result sent by the first device, where the third distance intermediate result is generated based on the first vector, a second random vector, and a second predefined algorithm, where the second random vector is generated by the first device based on the OT protocol; and obtain a second intermediate vector through the OT protocol, where the second intermediate vector is generated based on the binary vector corresponding to the second vector, the first vector, and the second random vector; acquire a fourth distance intermediate result based on the second intermediate vector and the first predefined algorithm; determine the target distance between the first vector and the second vector based on the second vector, the third distance intermediate result, and the fourth distance intermediate result; and determine whether the first data and the second data match based on the target distance and the predefined first distance threshold.

In some embodiments, the second processing module 52 is further configured to receive the target distance sent by the first device, and determine whether the first data and the second data match based on the target distance and the predefined first distance threshold.

In some embodiments, the second processing module 52 is further configured to receive a comparison result, sent by the first device, indicating whether the first data matches the second data.

Embodiment 8

Figure 6:
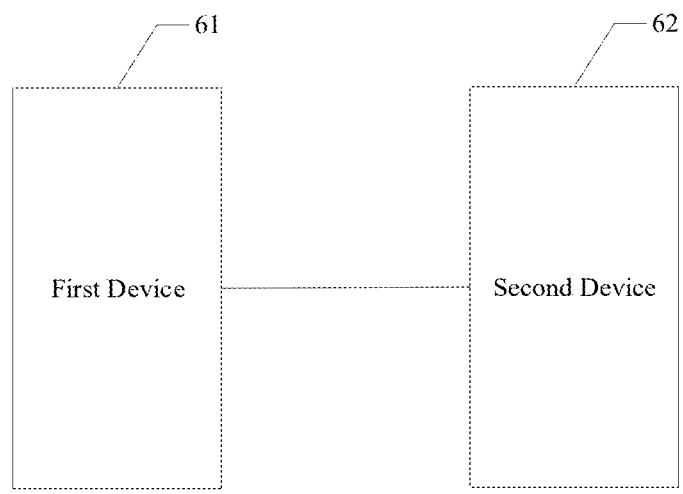
FIG. 6 is a schematic structural diagram of a data matching system, according to some embodiments of the disclosure.

Based on similar technical concepts, the disclosure provides a data matching system. FIG. 6 is a schematic structural diagram of a data matching system according to some embodiments of the disclosure. As shown in FIG. 6, the system includes the following.

A first device 61, configured to input to-be-matched first data into a pre-trained vector transformation model to obtain a first vector corresponding to the first data, and obtain a binary vector corresponding to the first vector.

A second device 62, configured to input to-be-matched second data into the pre-trained vector transformation model to obtain a second vector corresponding to the second data; and generate a first random vector based on the OT protocol.

The first device 61 is further configured to obtain a first intermediate vector through the OT protocol; and based on the first intermediate vector and a first predefined algorithm, obtain a first distance intermediate result, where the first intermediate vector is generated based on a binary vector corresponding to the first vector, a second vector and the first random vector.

The second device 62 is further configured to generate a second distance intermediate result based on the second vector, the first random vector and a second predefined algorithm, and send the second distance intermediate result to the first device.

The first device 61 is further configured to determine a target distance between the first vector and the second vector based on the first vector, the first distance intermediate result and the second distance intermediate result; and determine whether the first data and the second data match based on the target distance and a predefined first distance threshold.

Figure 7:
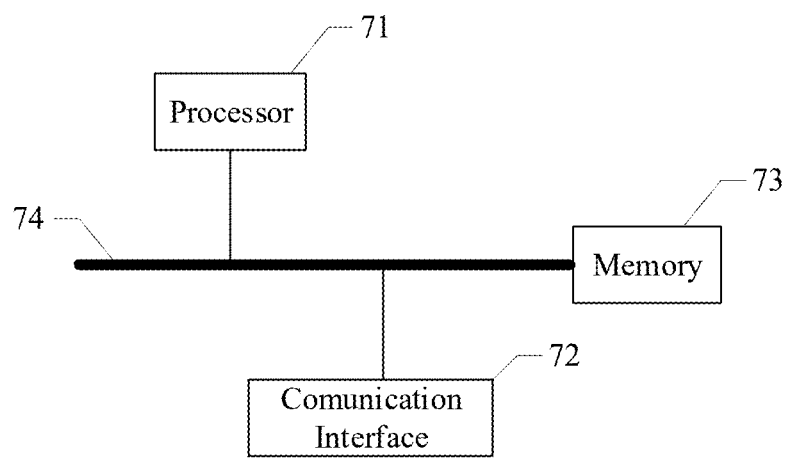
FIG. 7 is a schematic structural diagram of an electronic device, according to some embodiments of the disclosure.

Based on similar technical concepts, the disclosure also provides an electronic device. FIG. 7 is a schematic structural diagram of an electronic device according to some embodiments of the disclosure. As shown in FIG. 7, the electronic device includes: a processor 71, a communication interface 72, a memory 73, and a communication bus 74, where the processor 71, the communication interface 72, and the memory 73 communicate with each other through the communication bus 74.

The memory 73 stores a computer program. When the program is executed by the processor 71, the processor 71 executes the steps of the data matching method in any of the above embodiments.

Since the principle of solving the problems by the electronic device is similar to that of the data matching methods, the implementation of the electronic device may refer to the implementation of the methods, and the repetitive parts will not be repeated here.

The communication bus described in the electronic device may be a peripheral component interconnect (PCI) bus or an extended industry standard architecture (EISA) bus, etc. The communication bus may be divided into an address bus, a data bus, a control bus, etc. For ease of representation, merely one thick line is used in the figure, but it does not mean that there is merely one bus or one type of bus.

The communication interface 72 is configured for communication between the electronic device and other devices.

The memory may include a random access memory (RAM) or a non-volatile memory (NVM), such as at least one disk memory. Optionally, the memory may also be at least one storage device located away from the processor.

The processor may be a general-purpose processor, including a central processing unit, a network processor (NP), etc.; or may be a digital signal processing processor (DSP), an application-specific integrated circuit, a field programmable gate array or other programmable logic device, a discrete gate or transistor logic device, a discrete hardware component, etc.

Based on similar technical concepts, embodiments of the disclosure provide a computer-readable storage medium, where a computer program executable by an electronic device is stored in the computer-readable storage medium. When the program is executed on the electronic device, the steps of the data matching method of any of the above embodiments are implemented when the program is executed by the electronic device. Since the principle of solving the problem by the computer-readable storage medium is similar to that of the data matching methods, the implementation of the computer-readable storage medium may refer to the implementation of the methods, and the repetitive parts will not be repeated here.

The computer-readable storage medium may be any available medium or data storage device that may be accessed by the processor in the electronic device, including but not limited to magnetic storage such as floppy disks, hard disks, magnetic tapes, magneto-optical disks (MO), etc., optical storage such as CDs, DVDs, blue-ray discs (BDs), holographic versatile discs (HVDs, etc., and semiconductor storage such as ROMs, EPROMs, EEPROMs, non-volatile memories (e.g., NAND FLASH), solid-state drives (SSDs), etc.

Based on similar technical concepts, on the basis of the above embodiments, the disclosure provides a computer program product, which includes computer program code. When the computer program code runs on a computer, the computer program code enables the computer to execute the steps of any of the data matching methods described above.

Those skilled in the art will appreciate that the embodiments of the disclosure may be provided as methods, systems, or computer program products. Therefore, the disclosure may adopt the form of a complete hardware embodiment, a complete software embodiment, or an embodiment combining software and hardware. Moreover, the disclosure may adopt the form of a computer program product implemented on one or more computer-usable storage media (including but not limited to disk storage, CD-ROM, optical storage, etc.) containing computer-usable program codes.

The disclosure is described with reference to the flowcharts and/or block diagrams of the methods, devices (systems), and computer program products according to the disclosure. It should be understood that each process and/or block in the flowchart and/or block diagram, as well as the combination of the processes and/or blocks in the flowchart and/or block diagram, may be implemented by computer program instructions. These computer program instructions may be provided to a processor of a general-purpose computer, a special-purpose computer, an embedded processor, or other programmable data processing device to produce a machine, so that the instructions executed by the processor of the computer or other programmable data processing devices produce a device for implementing the functions specified in one or more processes in the flowchart and/or one or more blocks in the block diagram.

These computer program instructions may also be stored in a computer-readable memory that may direct a computer or other programmable data processing devices to work in a specific manner, so that the instructions stored in the computer-readable memory produce a manufactured product including an instruction device that implements the functions specified in one or more processes in the flowchart and/or one or more blocks in the block diagram.

These computer program instructions may also be loaded onto a computer or other programmable data processing devices so that a series of operational steps are executed on the computer or other programmable devices to produce a computer-implemented process, whereby the instructions executed on the computer or other programmable devices provide steps for implementing the functions specified in one or more processes in the flowchart and/or one or more blocks in the block diagram.

Apparently, those skilled in the art may make various changes and modifications to the disclosure without departing from the spirit and scope of the disclosure. Thus, if these modifications and variations of the disclosure fall within the scope of the claims of the disclosure and their equivalents, the disclosure is also intended to include these modifications and variations.

What is claimed is:

1. A data matching method, applied to a first device, the method comprising:
   inputting to-be-matched first data into a pre-trained vector transformation model, to obtain a first vector corresponding to the first data and a binary vector corresponding to the first vector;
   obtaining a first intermediate vector using an oblivious transfer (OT) protocol, and obtaining a first distance intermediate result based on the first intermediate vector and a first predefined algorithm, wherein the first intermediate vector is generated based on the binary vector corresponding to the first vector, a second vector and a first random vector, the second vector is obtained by a second device inputting second data into the pre-trained vector transformation model on the second device, and the first random vector is generated by the second device based on the OT protocol;
   receiving a second distance intermediate result generated, based on the second vector, the first random vector, and a second predefined algorithm, and sent by the second device;
   determining a target distance between the first vector and the second vector based on the first vector, the first distance intermediate result, and the second distance intermediate result; and
   determining whether the first data and the second data match based on the target distance and a predefined first distance threshold.

2. The method according to claim 1, wherein inputting the to-be-matched first data into the pre-trained vector transformation model to obtain the first vector corresponding to the first data comprises:
   determining a first target data type corresponding to the first data;
   determining a pre-trained first target vector transformation model corresponding to the first data according to the first target data type and a pre-stored correspondence between data types and pre-trained vector transformation models; and
   inputting the first data into the pre-trained first target vector transformation model to obtain the first vector corresponding to the first data.

3. The method according to claim 2, wherein the first target data type is one of a text type, a numerical type, or an image type.

4. The method according to claim 3, wherein:
   when the first target data type is the text type, the pre-trained first target vector transformation model corresponding to the first target data type is a word embedding model or a sentence embedding model;
   when the first target data type is the numeric type, the pre-trained first target vector transformation model corresponding to the first target data type is a one-hot encoding model; and
   when the first target data type is the image type, the pre-trained first target vector transformation model corresponding to the first target data type is an image embedding model.

5. The method according to claim 1, further comprising:
   generating a second random vector based on the OT protocol, and generating a third distance intermediate result based on the first vector, the second random vector and the second predefined algorithm; and
   sending the third distance intermediate result to the second device, so that the second device determines the target distance between the first vector and the second vector based on the second vector, the third distance intermediate result and a fourth distance intermediate result, and the second device determines whether the first data and the second data match based on the target distance and the predefined first distance threshold, wherein the fourth distance intermediate result is obtained based on a second intermediate vector and the first predefined algorithm, and the second intermediate vector is obtained through the OT protocol and is generated based on a binary vector corresponding to the second vector, the first vector and the second random vector.

6. The method according to claim 5, wherein:
   the third distance intermediate result is obtained by:
      for each first component in the first vector, determining a first square component of the first component,
      based on a corresponding second random component in the second random vector and position information of the second random component in a corresponding binary vector, determining a third random component sub-value corresponding to the first component, and
      based on a sum of the first square component and the third random component sub-value, determining the third distance intermediate result;
   the fourth distance intermediate result is obtained by:
      for each second component in the second vector, based on each binary component corresponding to the second component and a corresponding first component in the first vector, determining a product of the second component and the corresponding first component,
      based on a corresponding second random component in the second random vector and the position information of the second random component in the corresponding binary vector, determining a fourth random component sub-value corresponding to the second component, and based on a sum of the product of the second component and the corresponding first component and the fourth random component sub-value, determining the fourth distance intermediate result; and determining the target distance between the first vector and the second vector based on the second vector, the third distance intermediate result, and the fourth distance intermediate result includes:

for each second component in the second vector, determining a second square component of the second component, based on the second square component of the second component, the product of the second component and the corresponding first component, the third random component sub-value, the first square component of the corresponding first component, and the fourth random component sub-value, determining a sub-distance corresponding to the second component, and based on the sub-distance corresponding to each second component, determining the target distance between the first vector and the second vector.

7. The method according to claim 1, wherein, after determining the target distance between the first vector and the second vector, the method further comprises:

sending the target distance to the second device, so that the second device determines whether the first data and the second data match based on the target distance and the predefined first distance threshold.

8. The method according to claim 1, further comprising: sending a comparison result, indicating whether the first data and the second data match, to the second device.

9. The method according to claim 1, wherein lengths of the first vector and the second vector are both predefined lengths.

10. The method according to claim 1, wherein:

the first distance intermediate result is obtained by:

for each first component in the first vector, based on each binary component corresponding to the first component and a corresponding second component in the second vector, determining a product of the first component and the corresponding second component, based on a corresponding first random component in the first random vector and position information of the first random component in a corresponding binary vector, determining a first random component sub-value corresponding to the first component, and based on a sum of the product of the first component and the corresponding second component and the first random component sub-value, determining the first distance intermediate result;

the second distance intermediate result is obtained by:

for each second component in the second vector, determining a second square component of the second component; and based on the corresponding first random component in the first random vector and the position information of the first random component in the corresponding binary vector, determining a second random component sub-value corresponding to the second component, and based on a sum of the second square component and the second random component sub-value, determining the second distance intermediate result; and determining the target distance between the first vector and the second vector based on the first vector, the first distance intermediate result, and the second distance intermediate result includes:

for each first component in the first vector, determining a first square component of the first component, based on the first square component of the first component, the product of the first component and the corresponding second component, the first random component sub-value, the second square component of the corresponding second component, and the second random component sub-value, determining a sub-distance corresponding to the first component, and based on the sub-distance corresponding to each first component, determining the target distance between the first vector and the second vector.

11. The method according to claim 1, wherein determining whether the first data and the second data match based on the target distance and the predefined first distance threshold comprises:

determining whether the target distance is less than the predefined first distance threshold;

when the target distance is less than the predefined first distance threshold, determining that the first data matches the second data; and when the target distance is not less than the predefined first distance threshold, determining that the first data does not match the second data.

12. The method according to claim 11, wherein, after determining that the first data matches the second data, the method further comprises:

determining whether the target distance is equal to a preset second distance threshold, and when the target distance is equal to the preset second distance threshold, determining that the first data is the same as the second data.

13. A data matching method, applied to a second device, the method comprising:

inputting to-be-matched second data into a pre-trained vector transformation model to obtain a second vector corresponding to the second data, and generating a first random vector based on an OT protocol; and generating a second distance intermediate result based on the second vector, the first random vector and a second predefined algorithm, and sending the second distance intermediate result to a first device, so that the first device determines a target distance between a first vector and the second vector based on the first vector, a first distance intermediate result and the second distance intermediate result, and determines whether first data and the second data match based on the target distance and a predefined first distance threshold, wherein the first vector is obtained by inputting the first data into the pre-trained vector transformation model on the first device, the first distance intermediate result is obtained based on a first intermediate vector and a first predefined algorithm, and the first intermediate vector is generated based on a binary vector corresponding to the first vector, the second vector and the first random vector.

14. The method according to claim 13, wherein inputting the to-be-matched second data into the pre-trained vector transformation model to obtain the second vector corresponding to the second data comprises:

determining a second target data type corresponding to the second data;

determining a pre-trained second target vector transformation model corresponding to the second data according to the second target data type and a pre-stored correspondence between data types and pre-trained vector transformation models; and inputting the second data into the pre-trained second target vector transformation model to obtain the second vector corresponding to the second data.

15. The method according to claim 14, wherein the second target data type is one of a text type, a numerical type, or an image type.

16. The method according to claim 15, wherein:

when the second target data type is the text type, the pre-trained second target vector transformation model corresponding to the second target data type is a word embedding model or a sentence embedding model;

when the second target data type is a numeric type, the pre-trained second target vector transformation model corresponding to the second target data type is a one-hot encoding model; and when the second target data type is the image type, the pre-trained second target vector transformation model corresponding to the second target data type is an image embedding model.

17. The method according to claim 13, further comprising:

receiving a third distance intermediate result sent by the first device, wherein the third distance intermediate result is generated based on the first vector, a second random vector, and the second predefined algorithm, wherein the second random vector is generated by the first device based on the OT protocol;

obtaining a second intermediate vector through the OT protocol, where the second intermediate vector is generated based on a binary vector corresponding to the second vector, the first vector, and the second random vector;

acquiring a fourth distance intermediate result based on the second intermediate vector and the first predefined algorithm;

determining the target distance between the first vector and the second vector based on the second vector, the third distance intermediate result, and the fourth distance intermediate result; and determining whether the first data and the second data match based on the target distance and the predefined first distance threshold.

18. The method according to claim 13, wherein, after sending the second intermediate distance result to the first device, the method further comprises:

receiving the target distance sent by the first device, and determining whether the first data and the second data match based on the target distance and the predefined first distance threshold.

19. The method according to claim 13, further comprising:

receiving a comparison result, sent by the first device, indicating whether the first data matches the second data.

20. A data matching system, comprising:

a first device, configured to input to-be-matched first data into a pre-trained vector transformation model, to obtain a first vector corresponding to the first data and a binary vector corresponding to the first vector; and a second device, configured to input to-be-matched second data into the pre-trained vector transformation model to obtain a second vector corresponding to the second data, and generate a first random vector based on an OT protocol, wherein:

the first device is further configured to obtain a first intermediate vector through the OT protocol, and based on the first intermediate vector and a first predefined algorithm, obtain a first distance intermediate result, wherein the first intermediate vector is generated based on the binary vector corresponding to the first vector, the second vector, and the first random vector, the second device is further configured to generate a second distance intermediate result based on the second vector, the first random vector and a second predefined algorithm, and send the second distance intermediate result to the first device, and the first device is further configured to determine a target distance between the first vector and the second vector based on the first vector, the first distance intermediate result and the second distance intermediate result, and determine whether the first data and the second data match based on the target distance and a predefined first distance threshold.

* * * * *